United States Patent [19]

Hemme

[11] Patent Number: 4,508,314
[45] Date of Patent: Apr. 2, 1985

[54] GAS VALVE

[75] Inventor: Wilbur F. Hemme, Carol Stream, Ill.

[73] Assignee: Eaton Corporation, Cleveland, Ohio

[21] Appl. No.: 571,769

[22] Filed: Jan. 18, 1984

[51] Int. Cl.³ ............................................. F16K 31/00
[52] U.S. Cl. ........................................ 251/11; 251/78; 236/68 R
[58] Field of Search ................... 251/84, 76, 78, 11; 277/207 R; 236/68 R

[56] References Cited

U.S. PATENT DOCUMENTS 3,442,483  5/1969  Schwartz ............................. 251/11
4,102,496  7/1978  Perl .................................. 251/11 X Primary Examiner—William E. Wayner
Assistant Examiner—John M. Sollecito
Attorney, Agent, or Firm—C. H. Grace; R. A. Johnston

[57] ABSTRACT

A gas valve of the type having a movable resilient poppet attached to the free end of an electrically heated cantilever bi-metal arm. The poppet is preloaded by the arm to the closed position against a valve seat by the bi-metal arm and is lifted by warping the bi-metal arm with a predetermined electrical current. The poppet has a necked position received through an aperture near the free end of the arm. An annular bead ring is formed on the poppet and surrounds the neck. The annular bead is resiliently contacted by the surface of the arm in the preloaded condition.

5 Claims, 3 Drawing Figures

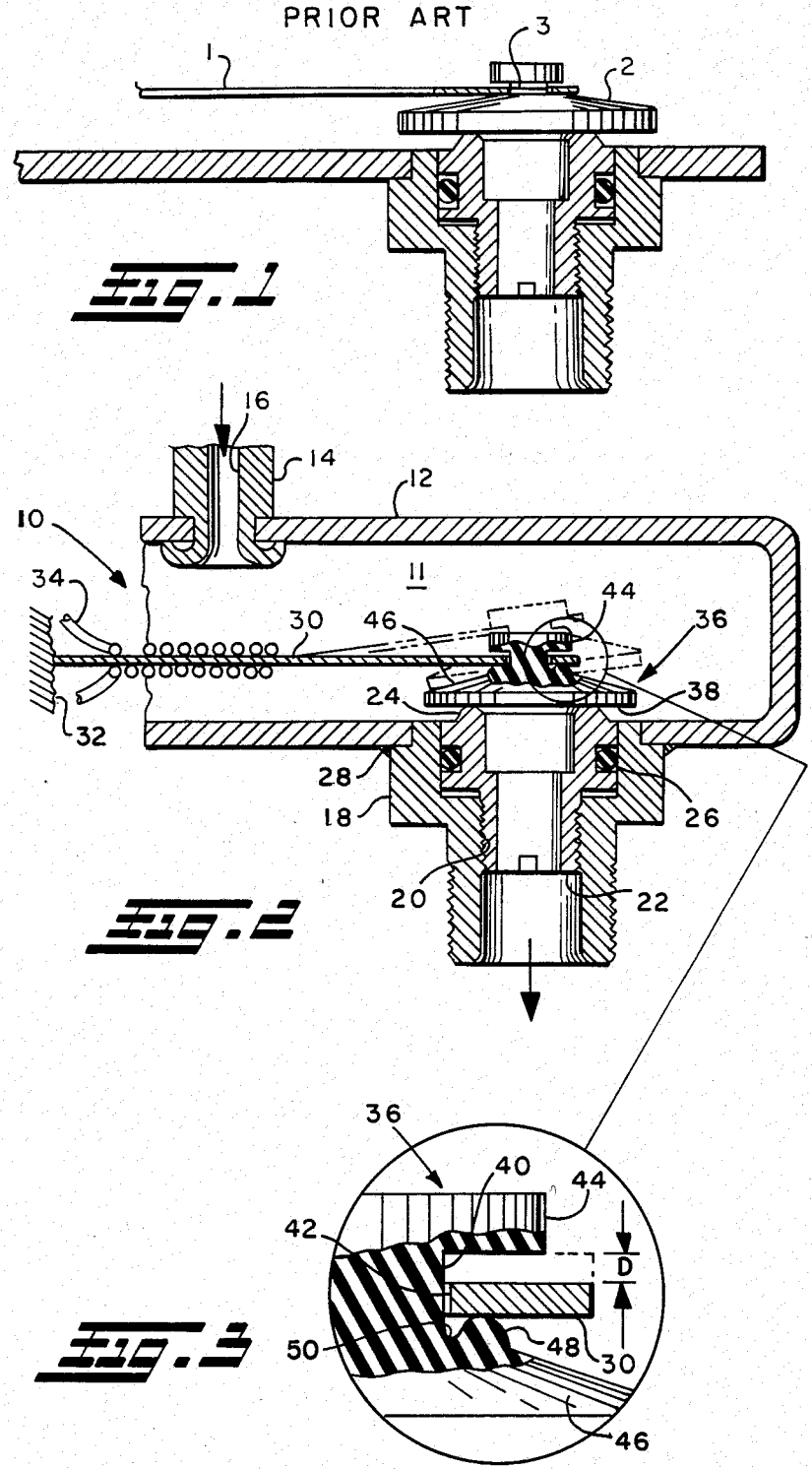

GAS VALVE

BACKGROUND OF THE INVENTION

The present invention relates to the design and construction of electrically energized valves employed for controlling flow of gaseous fuel to a burner. In particular, the present invention relates to gas fuel valves of the type employing a thermally actuated bi-metal element which deforms in response to electrical heating for opening the valve to permit flow of gaseous fuel to the burner.

It is known in the art to provide a thermally actuated gaseous fuel valve with a cantilever bi-metal arm having an elastomeric poppet provided on the free end thereof for movement between a closed position contacting a valve seat and a position spaced from the valve seat for permitting gaseous fuel flow over the valve seat to the valve outlet. Furthermore, it is known to employ an electrical resistance heating element disposed about the anchored end of the bi-metal arm for heating the arm in response to flow of electrical current through the resistance element. It is also known to configure the bi-metal arm in such a manner that in the unheated or unactuated condition, the bi-metal arm provides a preload biasing force to urge the resilient elastomeric poppet into contact with the valve seat.

In the aforesaid known thermally actuated gas valve construction, where a preload is provided for the poppet against the seat, the bi-metal arm must be heated to cause a predetermined amount of movement of the end thereof to release the preload on the poppet and effect poppet movement from the seat.

In such known thermally actuated gaseous fuel valves, the preload of the bi-metal arm against the poppet is absorbed by resilient deformation of the poppet in the portion thereof contacted by the free end of the bi-metal arm. Prior thermally actuated gaseous fuel valves have been calibrated such that the valve opens upon the flow of a predetermined current in the electrical heater actuator.

It has thus been the practice in known thermally actuated gaseous fuel valves to calibrate the opening or lifting of the poppet from the valve seat by deflection-preloading the bi-metal arm an amount equal to the movement thereof effected by the flow of the predetermined current. However, if the poppet does not provide elastic return of the local deformation under the preload of the bi-metal arm, the poppet may be caused to move from its seat at the onset of movement of the bi-metal arm under thermal actuation. This condition has occurred where the elastomeric material of the poppet has become "tacky" or where the elastomeric material has deformed around portions of the arm to prevent elastic return of the material upon initial movement of the bi-metal arm. This has thus caused the poppet to be lifted from the valve seat prematurely at an electrical current flow less than the calibrated level.

In certain types of fuel burner ignition control systems, the electrical thermally operated gaseous fuel valve is electrically connected with the control system such that the burner ignitor is activated by the flow of a predetermined current in the electrical actuator of the thermal valve. Thus, in such gaseous fuel burner ignition control systems, the condition of premature lifting of the valve poppet from the seat has resulted in the valve opening and discharge of fuel to the burner substantially in advance of the actuation of the burner ignitor.

Therefore, it is vital that the poppet of an electrically actuated thermal gaseous fuel valve lift from its seat at the appropriate rated current flow to the electrical valve actuator.

Thus, it has been desired to find a way of preventing "sticking" of the elastomeric poppet and an electric thermally actuated gaseous fuel valve such that premature lifting of the poppet from its valve seat does not occur.

SUMMARY OF THE INVENTION

The present invention provides attachment of an elastomeric poppet to a bi-metal actuator arm in an electrically operated thermally actuated gasous fuel valve in such a manner that the tendancy of the poppet to stick to the bi-metal arm and be lifted prematurely from its valve seat is eliminated.

The present invention employs a unique configuration of an elastomeric poppet for a electrically operated thermally actuated gaseous fuel valve having a bi-metal arm for effecting movement of the poppet from its valve seat. The elastomeric poppet employed in the novel valve construction of the present invention has the portions thereof contacted under the preload forces by the end of the bi-metal arm configured so as to provide resilient deformation under such preload forces, yet insure that the elastomeric material responds elastically upon initial movement of the bi-metal arm.

The poppet of the novel valve of the present invention has an annular bead disposed about the neck of the poppet attached to the bi-metal arm, which annular bead is spaced radially outwardly from the neck portion to prevent deformation of the poppet in the region adjacent the contact surfaces of the bi-metal arm. The annular bead is thus contacted by the bi-metal arm and resiliently absorbs the preload forces applied therefrom.

The present thus provides a unique construction for an electrically operated thermally actuated gaseous fuel valve which provides consistent and reliable operation of the valve for opening at a predetermined flow of electrical current.

BRIEF DESCRIPTION OF THE DRAWINGS

FIG. 1 is a partial cross-section of the poppet and seat subassembly of a known thermally actuated gaseous fuel valve;

FIG. 2 is a partial cross-sectional view of the seat and poppet portion of the valve of the present invention; and, FIG. 3 is an enlarged view of the encircled portion of FIG. 2.

DETAILED DESCRIPTION

Referring to FIG. 1, the known valve construction is shown as having a bi-metal arm denoted by numeral 1 with an elastomeric poppet 2 having a straight shank or neck portion 3 received through an aperture provided in the end of the bi-metal arm.

Referring now to FIG. 2, the valve assembly of the present invention indicated generally at 10 has a case or housing 12 having a gaseous fuel inlet fitting 14 provided thereon with an inlet passage 16 therethrough for communicating gaseous fuel from a pressurized source to the interior valving chamber 11 of the housing 12.

An outlet fitting 18 is secured to the exterior of the housing 12, at a location spaced from and generally remote from the inlet fitting 14, and has a threaded passage 20 provided therethrough for communicating with the chamber 11. The outlet fitting is sealingly attached to the case 12 by any suitable expedient as for example, the braised joint 28.

An annular seat member 22 is threadedly received in passage 20 for adjustable positioning therein and has an annular valve seat 24 provided on the upper end thereof with respect to FIG. 2. A suitable seal ring 26 is provided in an annular grooved disposed about the outer periphery of the member 22 and functions to prevent passage of gaseous fuel around the member 22 and between the member and the inner periphery of outlet fitting 18.

A bi-metal arm 30 is disposed in chamber 11 and has one end thereof secured in a moment-resisting mount indicated at 32; and, the arm 30 extends in cantilever therefrom with the free end thereof disposed over the valve seat 24. A suitable electrical heating arrangement comprising the wire coil 34 is disposed over the bi-metal arm in the region approximate the mount 32.

The heater coil 34 is adapted for connection through electrical connectors (not shown) passing through the case 12 to a source of electrical current.

An elastomeric poppet indicated generally at 36 has a generally flat seating surface 38 provided on the lower end thereof with respect to FIG. 2 which surface 38 contacts the valve seating surface 24 to seal thereagainst. The poppet 36 has a neck or shank 40 which is received through an aperture or cut-out 42 (see FIG. 3) provided in the bi-metal arm 30 adjacent the free end thereof.

The poppet 36 has a radially outwardly extending flange 44 formed on the upper end of the neck 40 which flange 44 has the outer periphery thereof substantially greater in diameter than the aperture 42. The neck 40 of the aperture has the lower end thereof joined to a generally conical outwardly extending flange portion 46 which has the heating surface 38 formed on the lower end face thereof.

The neck portion 40 of the poppet has the length thereof in the vertical direction with respect to FIGS. 2 and 3, sized to be of a length greater than the thickness of the bi-metal arm by an amount indicated by the reference character "D" in FIG. 3.

In operation, as current flows in heated coil 34, the bi-metal arm 30 deflects upwardly and a small portion of the movement of the free end of the arm 30 is absorbed in lost-motion movement through the "D" by the neck of the poppet before the upper surface of the arm 30 makes contact with the flange 44 and lifts the poppet from the valve seat. In the presently preferred practice of the invention, the distance "D" is on the order of 0.015 inches (0.38 millimeters).

Referring particularly to FIG. 3, the poppet has an annular bead 48 provided on the conical surface 46 of the lower flange which bead has a diameter greater than that of the neck 40 such that the bead is spaced radially outwardly from the neck and forms a groove 50 at the juncture of the bead and the neck 40. In the presently preferred practice, the bead 48 has an upwardly convex and preferably semicircular configuration in radial section as shown in FIG. 3.

In operation, the bi-metal arm is initially deflected during calibration, in the de-energized condition, so as to have the undersurface of the arm 30 biased downwardly to contact bead 48 and urge the poppet face 38 firmly against the valve seat 24. The downward bias or preload of arm 30 against the poppet bead 48 thus insures a positive closing force for the poppet against the valve seat. The arm 30 is calibrated, as is known in the art, to have an initial preload deflection such that a predetermined selected current flow in the heater 34 is required to cause the bi-metal arm to thermally deflect upwardly an amount sufficient to effect release of the preload against bead 48 at which point onset of valve opening occurs.

The unique construction of the poppet 36 of the present invention employing the rounded bead 48 enables the bi-metal arm 30 to preload the poppet downwardly in such a manner that the preload is absorbed by resilient deflection of bead 48 so as to prevent the juncture of the poppet neck 40 and conical flange 46 from sticking or wedging into the aperture 42. Elimination of the sticking of the poppet onto the arm 30, thus prevents lifting of the poppet before the desired current is flowing in heater 34 and thus prevents premature valve opening.

The unique valve construction of the present invention has been described hereinabove in the preferred practice with reference to the illustrated embodiment; however, it will be understood that modifications and variations in the invention made by those skilled in the art and the invention is limited only by the following claims.

What is claimed:

1. An electrically actuated valve assembly comprising:
   (a) housing means defining a valving chamber having a fluid inlet port and a fluid outlet port and including means defining a valve seat in the flow path between said inlet and outlet port;
   (b) a thermally responsive means mounted on said body means and disposed in said valving chamber and having an arm member having an end portion thereof disposed adjacent said valve seat and operative in response to electrically energized heating, to provide movement of said portion with respect to said valve seat; and,
   (c) poppet means received through said portion of said member, said poppet means formed integrally of resilient elastomeric material and having,
      (i) a flange portin disposed on one side of said arm member,
      (ii) a neck portion extending from said flange and received through said arm member,
      (iii) a valve head extending from said neck and disposed on a second side of said arm opposite said one side and having a valving face thereon for contacting said valve seat, to permit and prevent fluid flow thereover, said valve head having
   supporting means including co-operating surface portions of said arm second side, and said poppet means said supporting means being disposed about said neck for providing at least one contact surface for said arm against said poppet means upon said arm being biased in a direction tending to urge said valving face into contact with said valve seat, said supporting means being spaced radially outwardly from said neck thereby providing a groove at the juncture of the supporting means and said neck,
      (iv) said neck portion configured to have the distance from said flange to said supporting means greater than the thickness of said arm portion from said one side of said second side, wherein said neck portion permits a predetermined amount of lost-motion movement on said poppet means upon electrical heating of said arm for movement of said arm portion in a direction away from said valve seat.

2. The valve assembly defined in claim one, wherein said supporting means comprises an annular ring formed integrally on said poppet means surrounding said neck and spaced radially closely adjacent thereto.

3. The valve assembly defined in claim 1, wherein said supporting means comprises an annular ring surrounding said neck, said ring having a generally semicircular shape in a radial section.

4. The valve assembly defined in claim 1, wherein said valve seat defining means is adjustably mounted on said body means for calibrating the position of said valve seat with respect to said arm portion to provide with poppet head face preloaded against said valve seat when said arm is in the unheated condition.

5. The valve assembly defined in claim 1, wherein said neck is received in a cut-out formed in said end of said arm adjacent said valve seat.

* * * * *